(12) United States Patent
Perentes et al.

(10) Patent No.: US 11,259,666 B2
(45) Date of Patent: Mar. 1, 2022

(54) LIQUID PUMPING DEVICE COMPRISING A GEAR PUMP FOR BEVERAGE DISPENSER

(71) Applicant: NESTEC S.A., Vevey (CH)

(72) Inventors: Alexandre Perentes, Sullens (CH); Minh Quan Phan, Bussigny (CH); Nicolas Ganshof van der Meersch, Vufflens-le-Chateau (CH)

(73) Assignee: Societe des Produits Nestle S.A., Vevey (CH)

( * ) Notice: Subject to any disclaimer, the term of this patent is extended or adjusted under 35 U.S.C. 154(b) by 647 days.

(21) Appl. No.: 16/092,325

(22) PCT Filed: Apr. 10, 2017

(86) PCT No.: PCT/EP2017/058483
§ 371 (c)(1),
(2) Date: Oct. 9, 2018

(87) PCT Pub. No.: WO2017/178396
PCT Pub. Date: Oct. 19, 2017

(65) Prior Publication Data
US 2021/0204751 A1 Jul. 8, 2021

(30) Foreign Application Priority Data

Apr. 12, 2016 (EP) .................................. 16164796

(51) Int. Cl.
*F04D 29/26* (2006.01)
*A47J 31/46* (2006.01)
(Continued)

(52) U.S. Cl.
CPC ......... *A47J 31/468* (2018.08); *A47J 31/4403* (2013.01); *F04D 13/06* (2013.01); *F04D 29/007* (2013.01); *F04D 29/26* (2013.01); *G01F 3/10* (2013.01); *F04D 13/028* (2013.01); *F04D 15/0094* (2013.01)

(58) Field of Classification Search
CPC ........ F04D 13/04; F04D 13/028; F04D 13/06; F04D 15/0094; F04D 29/007; F04D 29/26
USPC ..... 137/99; 222/129.2, 129.4; 417/405, 408, 417/410.1
See application file for complete search history.

(56) References Cited

U.S. PATENT DOCUMENTS 3,822,591 A   7/1974   Li
5,012,837 A   5/1991   Zepp
(Continued)

FOREIGN PATENT DOCUMENTS

CN   102355943 A   2/2012
CN   102460086 A   5/2012
(Continued)

OTHER PUBLICATIONS

Chinese Office Action for Chinese Appl No. 2017800204138 dated Aug. 3, 2020.

*Primary Examiner* — Reginald Alexander
(74) *Attorney, Agent, or Firm* — K&L Gates LLP

(57) ABSTRACT

A liquid pumping device (1) for beverage dispenser comprising: -a housing (2) with a liquid inlet (3) and a liquid outlet (4); -a gear pump (5) positioned in the housing with the liquid inlet communicating with the gear pump; wherein a flowmeter (6) is fluidly positioned in the housing (2) preferably between the gear pump (5) and the liquid outlet (4).

7 Claims, 4 Drawing Sheets

(51) Int. Cl.
*A47J 31/44* (2006.01)
*G01F 3/10* (2006.01)
*F04D 13/06* (2006.01)
*F04D 29/00* (2006.01)
F04D 13/02 (2006.01)
F04D 15/00 (2006.01)

(56) References Cited

U.S. PATENT DOCUMENTS

| | | | |
|---|---|---|---|
| 6,131,770 | A | 10/2000 | Allen |
| 6,883,726 | B2 | 4/2005 | Polk et al. |
| 8,303,277 | B2 * | 11/2012 | Friedman ............. F04C 11/003 |
| | | | 418/9 |
| 2002/0017320 | A1 * | 2/2002 | Walton ................ G05D 11/008 |
| | | | 137/99 |
| 2009/0060728 | A1 * | 3/2009 | Grimes ............... F04C 15/0069 |
| | | | 415/200 |
| 2012/0305603 | A1 | 12/2012 | Kwok et al. |
| 2014/0056746 | A1 | 2/2014 | Flavelle |

FOREIGN PATENT DOCUMENTS

| | | |
|---|---|---|
| CN | 103622554 A | 3/2014 |
| JP | 2002116075 | 4/2002 |
| WO | 2006090183 | 8/2006 |
| WO | 2015102493 A1 | 7/2015 |

* cited by examiner

LIQUID PUMPING DEVICE COMPRISING A GEAR PUMP FOR BEVERAGE DISPENSER

CROSS REFERENCE TO RELATED APPLICATIONS

The present application is a National Stage of International Application No. PCT/EP2017/058483, filed on Apr. 10, 2017, which claims priority to European Patent Application No. 16164796.1, filed on Apr. 12, 2016, the entire contents of which are being incorporated herein by reference.

FIELD OF THE INVENTION

The present invention relates to field of beverage dispensers such as coffee or tea machines using a liquid pump to supply liquid, e.g., water, to a dose of beverage ingredients.

BACKGROUND ART

Certain beverage dispensers use capsules containing ingredients to be extracted or to be dissolved. For other dispensers, the ingredients are stored and dosed automatically in the machine or else added at the time of preparation of the beverage.

Various beverage dispensers, such as coffee machines are arranged to circulate liquid, usually water, from a water source that is cold or heated by heating means, to a mixing or infusion chamber where the beverage is actually prepared by exposing the circulating liquid to bulk or pre-packed ingredients (e.g. in capsules). From this chamber, the pre-pared beverage is usually guided to a beverage outlet where it is dispensed in a receptacle (e.g. cup, mug, bottle . . . ).

Most of the beverage dispensers possess liquid pump means which pump water from a source of water (e.g. water tank) through the mixing or infusion chamber, optionally, via a heater (e.g., thermoblock, tube heater, . . . ).

To control the amount of liquid and flow circulating to the mixing or infusion chamber, such machines typically include a flowmeter. The flowmeters used in such beverage machines are made of food safe materials and have to be economically affordable to be used in such machines.

Many patent publications relate to individual flowmeters and their specific constructions such as U.S. Pat. No. 4,666,061; EP0841547; WO2011067171.

One problem with the existing devices of the prior art lies in the need for assembling of the components of the fluid circuit (pump, flowmeter) via hoses and collars. There are many risks associated to these components assemblies. The assemblies can be defective (e.g. accidentally bent hose) and can wear and/or leak more rapidly. The length of hose may also affect the accuracy of the flow metering. In addition, these assemblies are not very compact and not easy to integrate in small beverage preparation appliances.

The present invention aims at solving the problems by providing a simple, compact, reliable liquid pumping device having integrated flow measuring capacity.

SUMMARY OF THE INVENTION

The invention thus relates to a liquid pumping device for beverage dispenser comprising:
  a housing with a liquid inlet and a liquid outlet;
  a gear pump positioned in the housing with the liquid inlet communicating with the gear pump;
wherein a flowmeter is fluidly positioned in the housing.

Preferably, the flowmeter is fluidly positioned in the housing between the gear pump and the liquid outlet.

By "liquid inlet" and "liquid outlet" it is meant liquid connectors or orifices enabling fluid connection with other components of the fluid circuit of the dispenser (e.g., hose, water tank, heater, extraction or infusion chamber).

It is an advantage to have both the flowmeter and gear pump be in the same housing and an additional advantage to have the flowmeter positioned at the "pressurized side" of the pump to avoid priming issue with the pump.

Preferably, the flowmeter comprises a measuring member rotatable by the liquid flow passing through the flow meter and a sensor for sensing a rotation-related parameter of the measuring member. The measuring member can be, for instance, an impeller which rotates by effect of the flow of liquid circulating in the flowmeter.

According to a preferred aspect of the invention, the gear pump communicates with the flowmeter in the housing by a non-deformable conduit. Therefore, the risk of wearing and/or leakage is prevented or reduced. By "non-deformable" it is meant that the conduit extends between the gear pump and the flowmeter and that these two components cannot be moved relative to one another when assembled, so that the conduit remains in a fixed predetermined position. The conduit is preferably formed in rigid material that is not easily deformable such as rigid plastic or metal. Preferably, the intermediate conduit extends in an axial direction which is perpendicular to the plane of extension the gear pump extends in. This arrangement participates to the compactness of the device and facilitates its integration in small beverage dispensers.

Preferably, the gear pump comprises a driving shaft arranged to protrude from a first side of the housing and the sensor is positioned on a second side of the housing which is opposed to the first side. This arrangement provides an optimized compactness to the device and reduces the risk of electrical, and/or electromagnetic disturbance to the sensor by the electrical driving motor.

Preferably, the rotatable measuring member has a rotation bearing which is arranged in the same direction as the one of the driving shaft of the gear pump. In other words, the gear pump and flowmeter are arranged substantially adjacent one another and in parallel so that a maximum compactness is obtained and a reduced internal flow path is achieved for better measurement accuracy. In addition, a short rigid liquid conduit can be arranged between the gear pump and the flowmeter in the housing. Such liquid conduit is preferably arranged in the axial direction and perpendicular to the plane of extension of the gear pump and measuring device, i.e. in the direction of the driving shaft and rotation bearing.

Preferably, the housing is built in several blocks assembled in adjacent manner. Most preferably, the blocks are formed of rigid material such as plastic or metal and which the cavities and conduits are formed in the blocks.

The gear pump can comprise a pump cavity provided in a first housing block. The driving gear and a following gear of the gear pump are thus housed in the pump cavity.

A second housing block can also be provided adjacent the first housing block, preferably, to close the pump cavity. The flowmeter can comprise a flow cavity provided in the second housing block and an impeller rotatably housed in the flow cavity.

A third housing block can be provided adjacent the second housing block, preferably to close the flow cavity.

Preferably, the sensor is housed in the third housing block. For example, the sensor is housed in a cavity provided in the housing block.

The sensor can be any suitable sensor capable of measuring a rotation-related parameter of the measuring member, e.g. impeller.

Preferably, the first, second and third housing blocks are piled up in an axial direction which is perpendicular to the transversal plane the gear pump and impeller extend in. With such arrangement, the device remains very compact and can be easily integrated in small domestic beverage appliances.

The sensor may be one to obtain information from the measuring member by any one or a combination of: Hall effect, induction, capacitive effect, ultrasounds, infra-red.

In a preferred mode, the rotatable measuring device comprises at least one magnet and the sensor is a Hall sensor. The Hall sensor detects the rotating magnetic field generated by the one or more magnets and convert it into a corresponding electrical signal, i.e., a frequency or number of electrical pulses, which is related to the rotation speed of the measuring device, e.g., impeller.

The device also preferably comprises an electrical rotary motor connected to the driving shaft.

BRIEF DESCRIPTION OF THE DRAWINGS

The invention will now be described with reference to the drawings attached.

DESCRIPTION OF A PREFERRED EMBODIMENT

Figure 1:
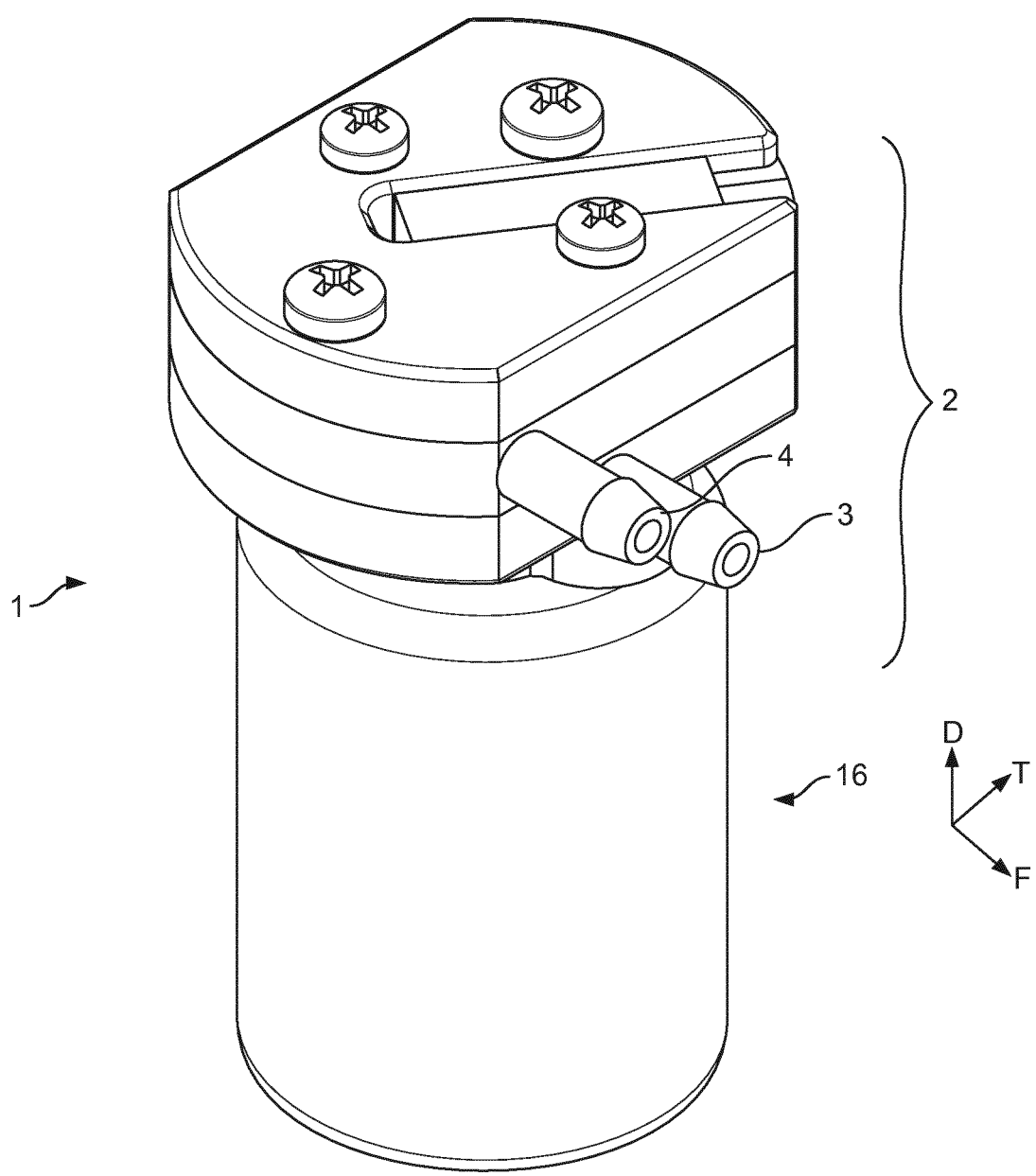
FIG. 1 shows a perspective view of the device of the invention.
Figure 2:
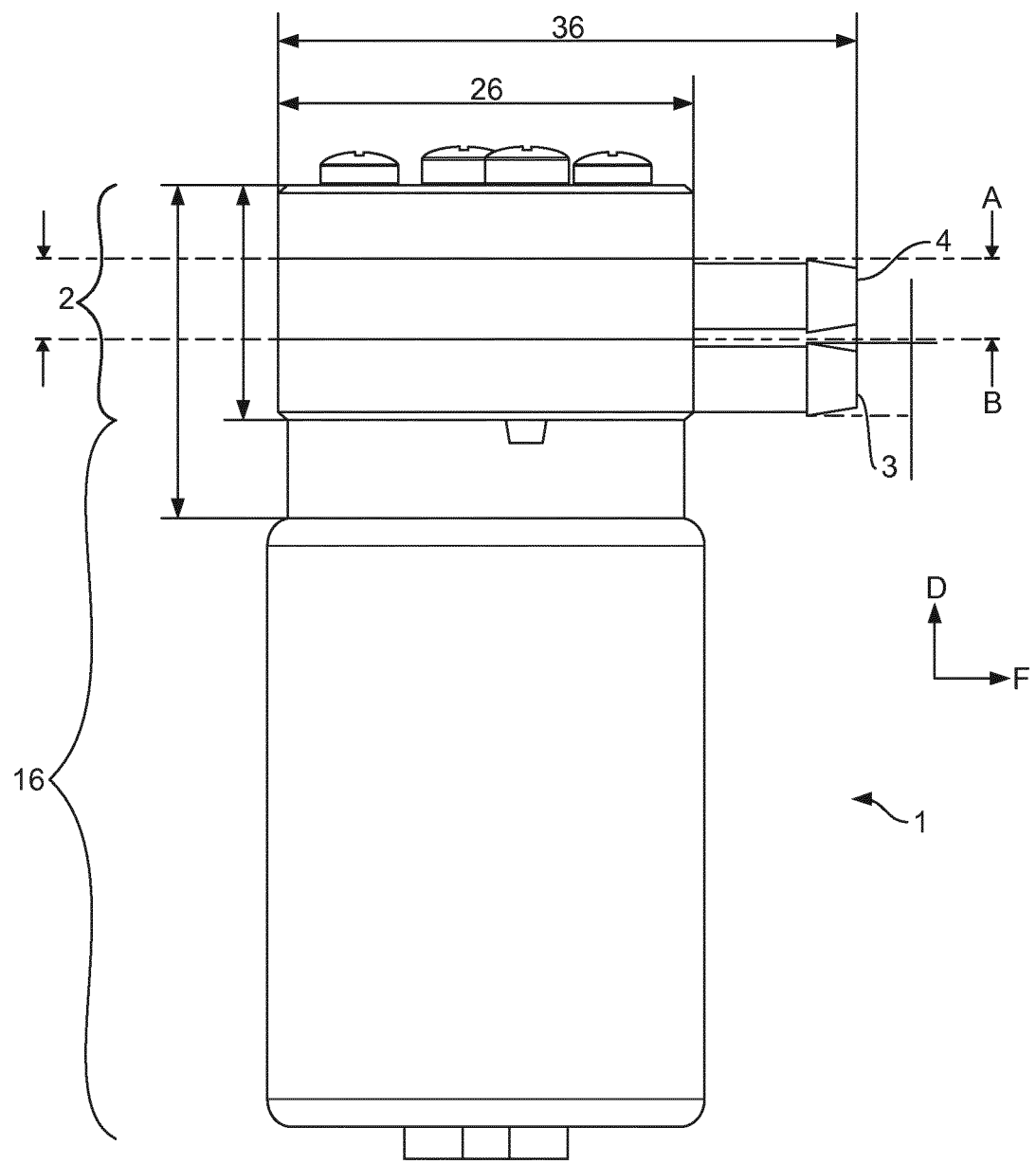
FIG. 2 shows a view of profile of the device of the invention
Figure 3:
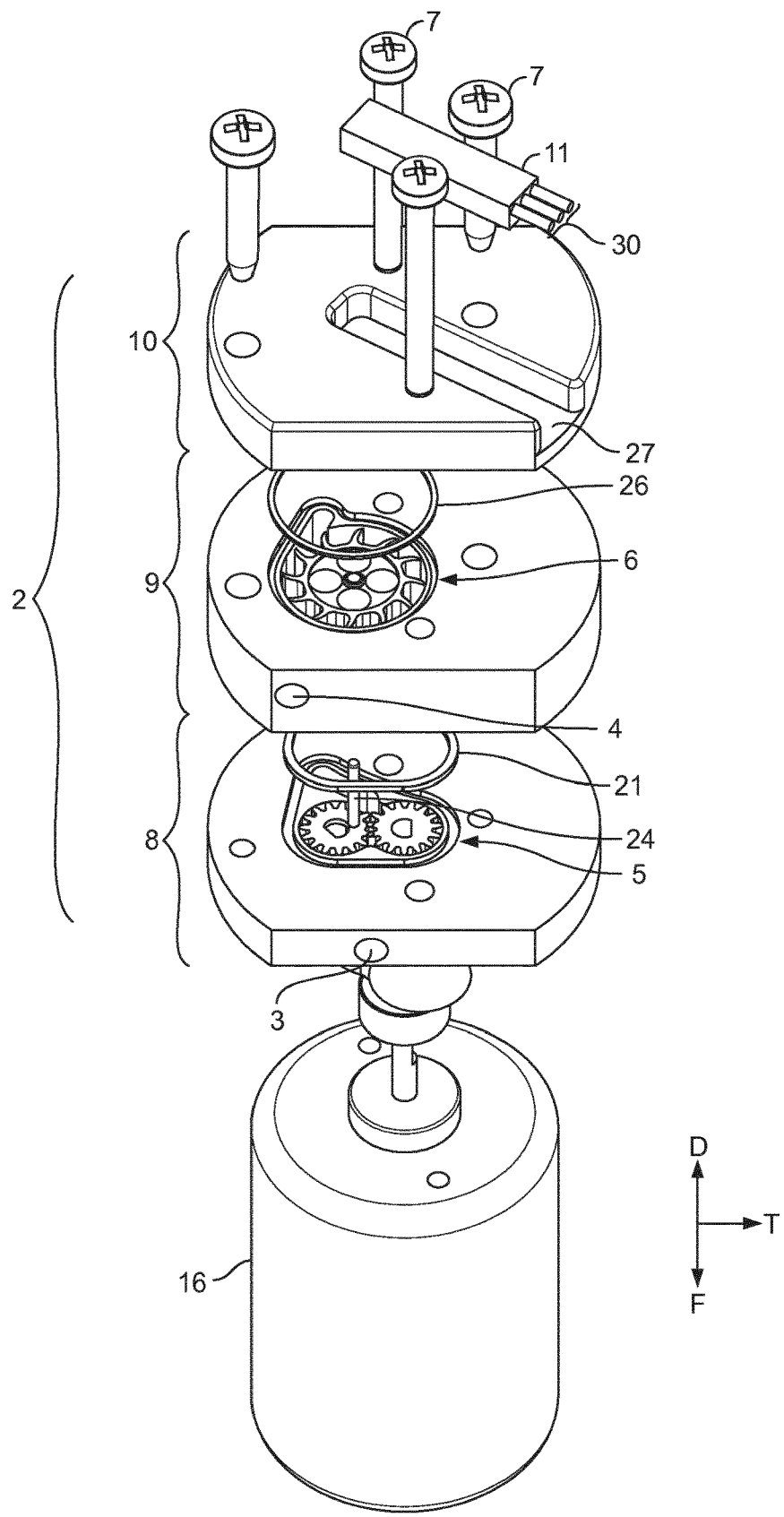
FIG. 3 is an exploded view of the device of the invention (inlet and outlet connectors missing)
Figure 4:
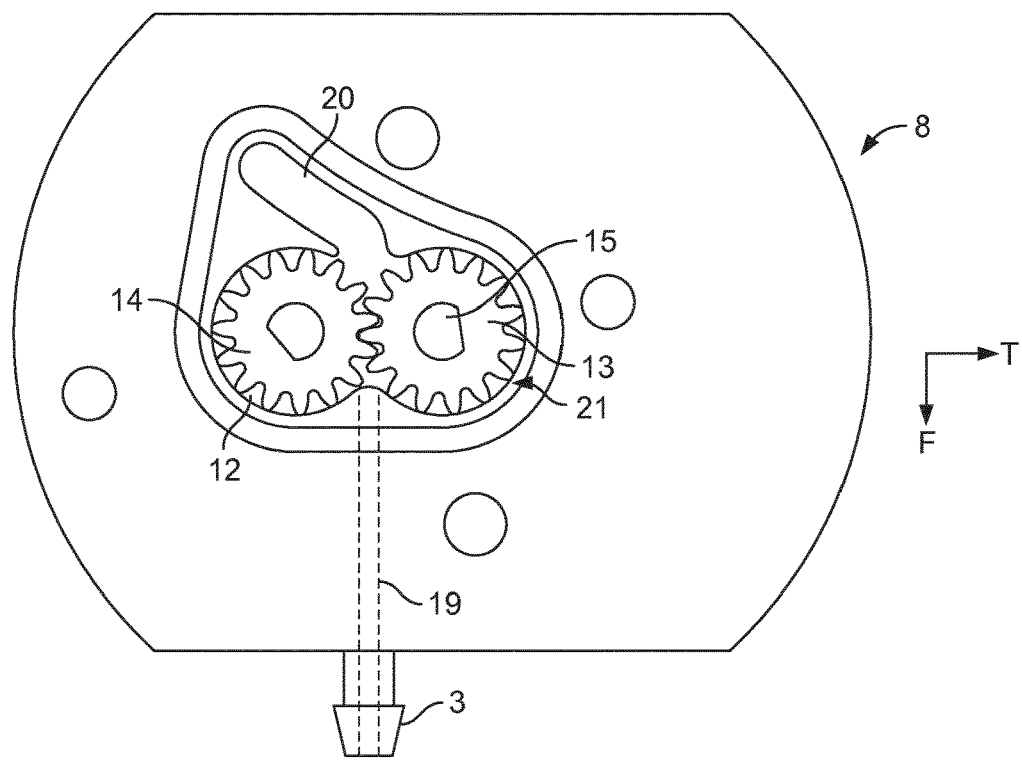
FIG. 4 is a view of the device in sectional plane A-A.
Figure 5:
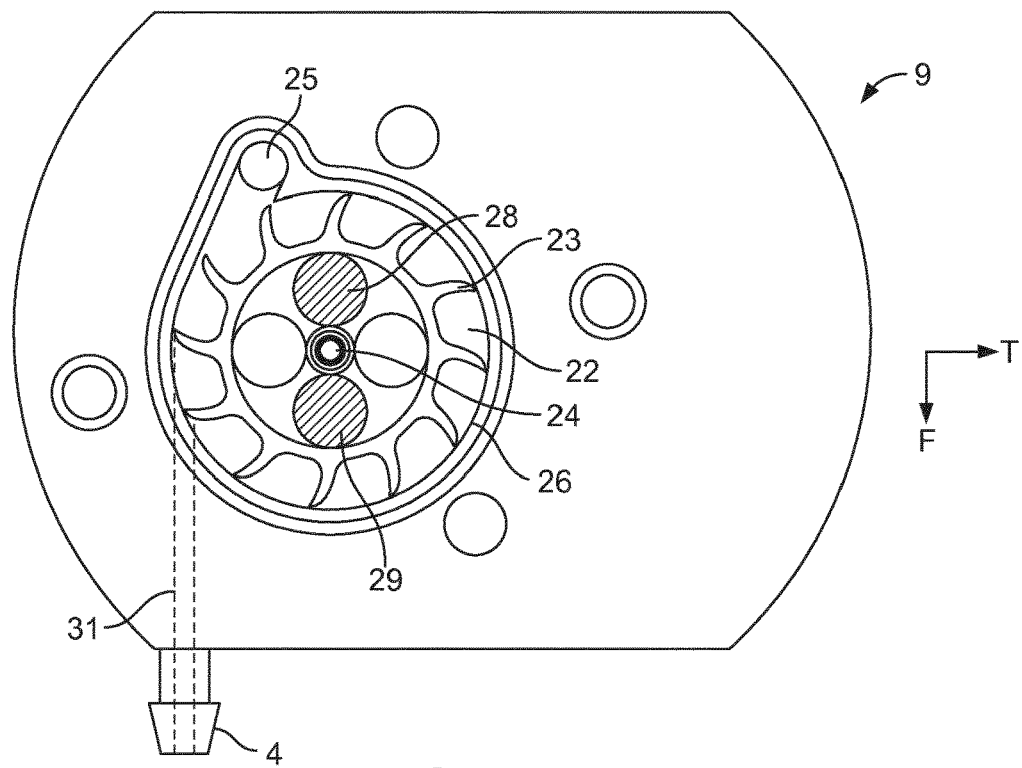
FIG. 5 is a view of the device in sectional plane B-B.

The liquid pumping device of the invention is illustrated in the attached FIGS. 1 to 5. The device 1 comprises a housing 2 comprising a liquid inlet 3 and a liquid outlet 4. The inlet and outlet can take the form of liquid connectors protruding from the housing. The connectors are designed to be connected to liquid hoses of a beverage dispenser. In particular, the liquid inlet 3 can be connected to a hose which links with a water tank of the dispenser for supplying the device with fresh water. The liquid outlet 4 can be connected to a hose which links with a heater such as a thermoblock or tube heater for heating the pressurized water coming out of the device.

According to an aspect of the invention, the housing comprises both a gear pump 5 and a flowmeter 6 arranged in a manner to save space and provide the minimal length of internal conduit. In relation with FIG. 3, the housing is built from several blocks which are assembled together, e.g., for forming solid, unified assembly of blocks, by connection means such as by screws 7. A first housing block 8 is provided which comprises the gear pump 5. A second housing block 9 is provided adjacent the first housing block which comprises the flowmeter and a third housing block 10 is provided adjacent the second housing block 9 which comprises the sensor 11 for the flowmeter.

In the first housing block 8 (FIG. 4), a pump cavity 12 is provided to receive the driving gear 13 and following gear 14 of the gear pump. The driving gear 13 has a drive shaft 15 which is connected to an electrical motor 16. If necessary, the drive shaft may be connected directly or via a gear reduction.

The drive shaft 15 preferably protrudes on a first side 17 of the housing whereas the sensor 11 is positioned on a second side 18 of the housing which is opposed to the first side. This arrangement is preferred to prevent electromagnetic disturbance but could be different, e.g., with the sensor being on another side of the housing.

The liquid inlet 3 communicates to the pump cavity 12 via an inlet conduit 19 to the entry of the gear pump. The pump cavity 12 communicates with an outlet conduit 20 which extends in the transversal plane FT of the first housing block. The length of the conduit can be minimal, e.g., 0.5-2 cm. It must be noted that the outlet conduit 20 could also just be an extension of the cavity.

The gear pump's cavity 12 further comprises a sealing gasket 21 encompassing the two gears and outlet conduit 20.

The second housing block 9 comprises a flow cavity 22 for lodging the measuring member or impeller 23. The impeller is rotatably mounted in the cavity 22 by a rotation bearing 24. Preferably, the rotation bearing 24 extends in the same transversal plane FT as the drive shaft 15 of the gear pump. A parallel arrangement of the gear pump and flow meter is therefore obtained. As a result, the thickness of the first and second blocks in the axial direction D can be reduced making the device very compact and limiting the length of the flow path between the two blocks.

The second housing block 9 fluidly connects to the first housing block by an intermediate conduit 25 which is also arranged in the axial direction D of the device. This axial conduit 25 links the flow cavity 22 to the transversal outlet conduit 20 of the pump cavity 12 of the gear pump. The length of the axial conduit 25 is preferably small, e.g., 0.5-1 cm. Since the conduit 25 is directly formed in the housing block 9 and the housing blocks 8, 9 are adjacent and connected to each other, the position and form of the conduit 25 is well defined in the device and remains so when the device is implemented and operated in the beverage dispenser.

The flow cavity 22 further communicates with a liquid outlet conduit 31 which is preferably arranged tangential to the cavity. The position of the conduit 31 also in transversal plane FT is also preferably positioned fluidly away from the intermediate conduit 25 at an angle of less than 180 degrees. More preferably, the angle is between 90 and 120 degrees.

The flow cavity 22 further comprises a sealing gasket 26.

In the preferred arrangement, the external surface of the second housing block 9 closes the cavity 12 of the gear pump in liquid tight manner against the seal gasket 21. This arrangement saves an additional piece of the device. However, in an alternative arrangement, an intermediate housing lid can be placed between the two housing blocks to close the cavity 12 and compresses in sealing engagement with the sealing gasket 21.

The third housing block 10 is arranged in a manner adjacent to the second housing block so that its internal surface closes the flow cavity 22 in a liquid tight manner against the sealing gasket 26 of the flowmeter.

The flow sensor 11 is housed in the third housing block 10 such as in a dedicated sensor cavity 27. The sensor is preferably a Hall sensor which interacts with one magnet, more preferably two diametrically opposed magnets 28, 29 inserted in the impeller. The Hall sensor is positioned in axial alignment in direction D with the rotational path of the magnet(s) such that the magnetic field of the magnet is properly detected during rotation of the impeller by the sensor.

During use of the flowmeter, liquid is circulated from the inlet to the outlet by the gear pump via the voids provided between the impeller and the flow cavity. The flow of liquid is intercepted by the blades of the impeller thus driving it in rotation about its bearing 24. The speed of rotation of the impeller is proportional to the flow of liquid circulating through the flowmeter. By rotating the impeller, the magnets are rotated adjacent to the Hall sensor. The Hall sensor detects the rotating magnetic field generated by the magnets and converts into a corresponding electrical signal having a frequency corresponding to the speed of rotation of the impeller. The sensor preferably comprises a Hall effect sensing element and a resistance (e.g. 5 KΩ). The sensor also comprises an electrical pin 30 to facilitate electrical mounting of the sensor to the input circuit of the control unit of the beverage dispenser.

In the pressure working range of the device (i.e. 0.4-3 bar), the frequency or number of pulses generated by the Hall sensor may deviate from the actual flow rate depending on the pressure at the exit of the gear pump. This deviation is found to be linear and the higher the pressure the higher the deviation. This deviation can so be corrected automatically by a suitable algorithm of the control unit of the beverage dispenser. As a result, a very precise flow rate is obtained in the full pressure range of the gear pump.

The accuracy of the measurement of the flow rate can be improved by reducing the diameter of the intermediate conduit 25 at the entry of the flowmeter. For example, for a device capable of delivering water at flow rates of from 50 to 400 ml/min, a diameter as low as 1-2 mm appears to provide a correct accuracy at an acceptable pressure loss.

As an example, the device of the invention may be sized with a housing of only about 17 cm$^2$ but capable of delivering a controllable water flow rate between 50 to 400 ml/min within a pressure range of 0 to 3 bar. The number of pulses at 400 ml/min can be as high as 7000 pulses. The diameter of the impeller can be as low as 8 mm and the distance between gears can be only about 6 mm. The diameter of the intermediate conduit can be as low as 2 mm and its length as low as 2.6 mm.

REFERENCES

1. Device
2. Housing
3. Liquid inlet
4. Liquid outlet
5. Gear pump
6. Flowmeter
7. Screws
8. First housing block
9. Second housing block
10. Third housing block
11. Flowmeter sensor
12. Gear pump cavity
13. Driving gear
14. Following gear
15. Drive shaft
16. Electrical motor
17. First side (housing)
18. Second side (housing)
19. Inlet conduit
20. Outlet conduit
21. Sealing gasket
22. Flow cavity
23. Impeller
24. Bearing
25. Intermediate conduit
26. Sealing gasket
27. Sensor cavity
28. Magnet
29. Magnet
30. Electrical pin
31. Liquid outlet conduit

The invention claimed is:

1. A liquid pumping device for a beverage dispenser, the liquid pumping device comprising:
   a housing with a liquid inlet and a liquid outlet;
   a gear pump positioned in the housing with the liquid inlet communicating with the gear pump, wherein the gear pump comprises a driving shaft arranged to protrude from a first side of the housing; and
   a flowmeter fluidly positioned in the housing, the flowmeter comprises a measuring member rotatable by the a liquid flow passing through the flowmeter, the flowmeter further comprises a sensor for sensing a rotation-related parameter of the measuring member, and the sensor is positioned on a second side of the housing opposed to the first side.

2. The liquid pumping device according to claim 1, comprising an electrical rotary motor connected to the driving shaft.

3. The liquid pumping device according to claim 1, wherein the gear pump is configured to communicate with the flowmeter in the housing by a non-deformable intermediate conduit.

4. The liquid pumping device according to claim 3, wherein the non-deformable intermediate conduit extends in an axial direction perpendicular to a plane of extension the gear pump extends in.

5. The liquid pumping device according to claim 1, wherein the measuring member has a rotation bearing arranged in the same axial direction as an axial direction of a driving shaft of the gear pump.

6. The liquid pumping device according to claim 1, wherein the measuring device comprises at least one magnet, and the sensor is a Hall sensor.

7. The liquid pumping device according to claim 1, wherein the sensor senses a rotation-related parameter by a characteristic selected from the group consisting of induction, capacitive effect, ultrasounds, and infra-red.

* * * * *